United States Patent
Susko

(10) Patent No.: US 6,595,570 B2
(45) Date of Patent: Jul. 22, 2003

(54) VEHICLE SEAT ASSEMBLY HAVING LOAD CELL BASED SEAT OCCUPANT SENSING SYSTEM

(75) Inventor: Thomas Susko, St. Clair Shores, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/996,403

(22) Filed: Nov. 21, 2001

(65) Prior Publication Data

US 2002/0063419 A1 May 30, 2002

Related U.S. Application Data

(60) Provisional application No. 60/252,684, filed on Nov. 22, 2000.

(51) Int. Cl.$^7$ ............................ B60R 21/32; B60K 28/04
(52) U.S. Cl. ....................... 296/68.1; 280/735; 180/273; 701/45
(58) Field of Search ................................ 296/63, 65.13, 296/68; 73/1.15, 862.325; 180/273; 280/735; 701/45

(56) References Cited

U.S. PATENT DOCUMENTS

| | | | | |
|---|---|---|---|---|
| 5,213,300 A | * | 5/1993 | Rees ........................... 248/429 |
| 5,314,206 A | * | 5/1994 | Vollmer .................. 280/801.1 |
| 5,612,876 A | | 3/1997 | Zeidler et al. ......... 364/424.055 |
| 5,624,132 A | | 4/1997 | Blackburn et al. .......... 280/735 |
| 5,810,392 A | | 9/1998 | Gagnon ...................... 280/735 |
| 5,905,210 A | | 5/1999 | O'Boyle et al. ........ 73/862.331 |
| 5,918,696 A | | 7/1999 | Van Voorhies .............. 180/273 |
| 5,971,432 A | | 10/1999 | Gagnon et al. ............. 280/735 |
| 5,991,676 A | | 11/1999 | Podoloff et al. ............... 701/45 |
| 6,012,007 A | | 1/2000 | Fortune et al. ................ 701/45 |
| 6,039,344 A | | 3/2000 | Mehney et al. .............. 280/735 |
| 6,045,155 A | | 4/2000 | Cech et al. .................. 280/735 |
| 6,056,079 A | | 5/2000 | Cech et al. .................. 180/273 |
| 6,058,341 A | | 5/2000 | Myers et al. .................. 701/45 |
| 6,069,325 A | | 5/2000 | Aoki .......................... 177/136 |
| 6,070,115 A | | 5/2000 | Oestreicher et al. .......... 701/45 |
| 6,076,853 A | | 6/2000 | Stanley ........................ 280/735 |
| 6,109,117 A | | 8/2000 | Stanley et al. .......... 73/862.325 |
| 6,134,947 A | | 10/2000 | Kwun ........................ 73/35.12 |
| 6,161,891 A | * | 12/2000 | Blakesley ................ 296/65.01 |
| 6,323,443 B1 | * | 11/2001 | Aoki et al. .................. 177/144 |

FOREIGN PATENT DOCUMENTS

JP          03112749    *   5/1991   .............. 280/801.1

* cited by examiner

Primary Examiner—D. Glenn Dayoan
Assistant Examiner—Paul Chenevert
(74) Attorney, Agent, or Firm—Bill C. Panagos

(57) ABSTRACT

A seat frame assembly includes a seat portion and a seat back. Upper and lower tracks are positioned beneath the seat portion. The upper track is connected to the seat portion. The tracks are slidable relative to one another to move the seat portion and the seat back. A seat belt restraint is positioned underneath the seat back between the seat portion and the upper track and is connected to the upper track. A riser is positioned on a floor beneath the lower track. A load cell is interposed between the lower track and the riser at a level below the seat belt restraint. A fastener extending through the cell mounts the lower track to the riser. The cell generates a signal indicative of the weight of a seat portion occupant. A spring may be interposed between the cell and the lower track to impart a predetermined load on the cell to enhance the system resolution.

4 Claims, 6 Drawing Sheets

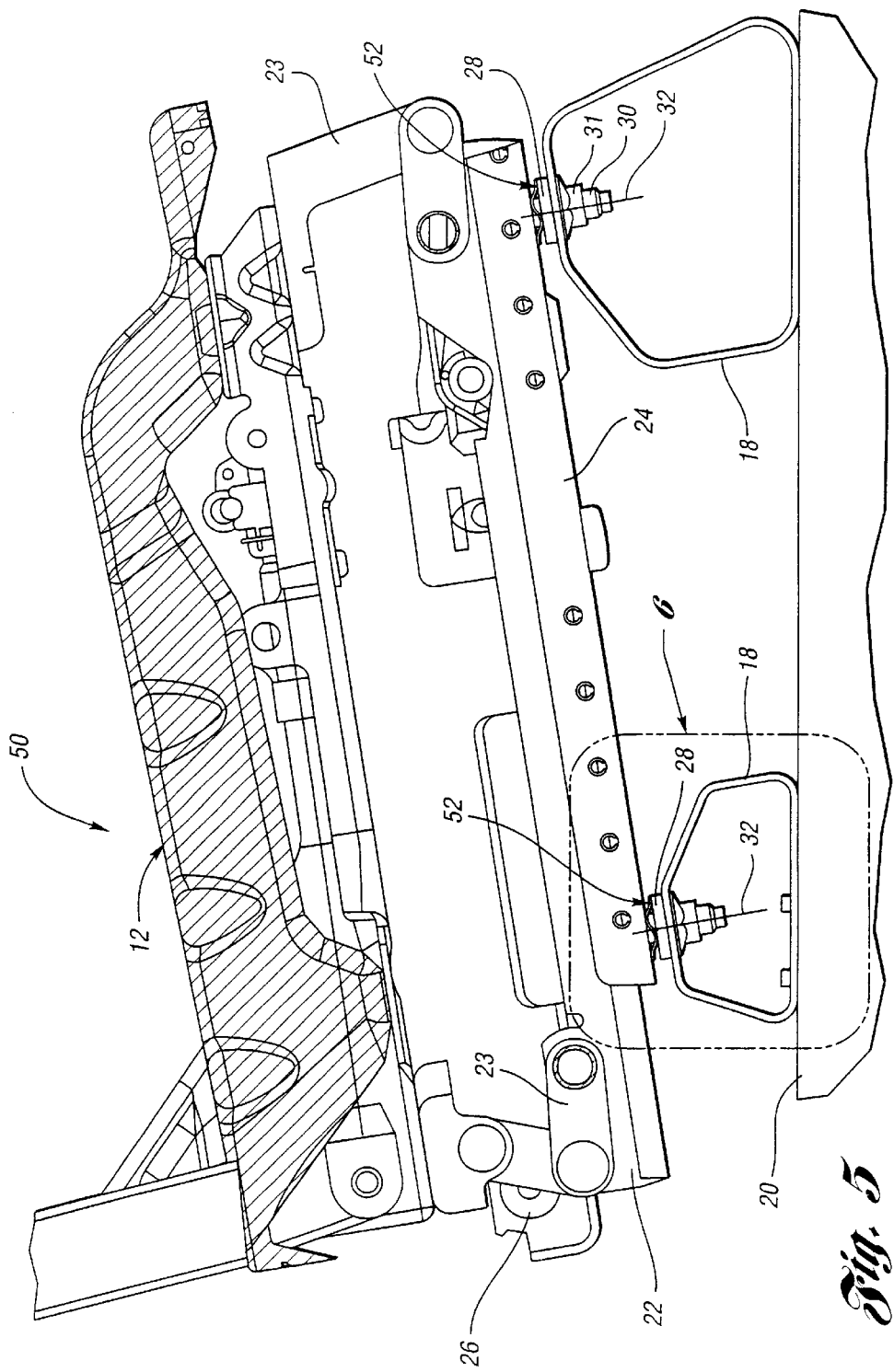

US 6,595,570 B2

VEHICLE SEAT ASSEMBLY HAVING LOAD CELL BASED SEAT OCCUPANT SENSING SYSTEM

CROSS-REFERENCE TO RELATED APPLICATIONS

This application claims the benefit of U.S. Provisional Application No. 60/252,684, filed Nov. 22, 2000.

BACKGROUND OF THE INVENTION

1. Field of the Invention

The present invention relates generally to vehicle seat occupant sensing systems and, more particularly, to a vehicle seat frame assembly having at least one flat washer style load cell packaged in the Federal Motor Vehicle Safety Standards (FMVSS) 207/210 load path for sensing the presence, weight, and/or center of gravity of a seat occupant.

2. Background Art

Vehicles such as automobiles are equipped with seat occupant sensing systems and safety devices such as air bags and seat belts to protect seat occupants. Typical seat occupant sensing systems provide a sensing output indicative of the seat occupant such as the weight of the occupant. Safety devices associated with a seat may be controlled as a function of the sensing output. For example, if a seat occupant sensing system senses that the weight of a seat occupant is indicative of a child occupying the seat, then a safety device such as an air bag associated with the seat may be deployed with less force than if the seat occupant is an adult. Furthermore, if the seat occupant sensing system senses that a seat is unoccupied, i.e., senses that there is no weight on the seat, then the safety device associated with the seat can be deactivated.

Some typical seat sensing systems include load cells having a cantilever or bridge style instrumented with a strain gage. A problem with such loads cells is that they do not provide optimal loading conditions in the FMVSS 207/210 load path because the strain gage substrate must be robust enough to resist the FMVSS 207/210 load or an additional bracket must be used to resist the FMVSS 207/210 load after the strain gage substrate deforms.

What is needed is a seat sensing system having a load cell which can be packaged in the FMVSS 207/210 load path without having to resist the FMVSS 207/210 load in a vehicle seat frame assembly. Such a load cell would include a flat washer style load cell and a primary load carrying member such as a fastener passing through the load cell to clamp upper and lower seat frame members together. The fastener would bear the brunt of the FMVSS 207/210 load and, as a result, the flat washer style load cell would not be required to manage the FMVSS 207/210 load.

SUMMARY OF THE INVENTION

It is an object of the present invention to provide a seat frame assembly having at least one flat washer style load cell positioned in the FMVSS 207/210 load path for sensing the presence, weight, and/or center of gravity of a seat occupant.

It is another object of the present invention to provide a seat frame assembly having at least one flat washer style load cell positioned between upper and lower seat members at a level underneath the seat belt restraint attachment of the seat for sensing the presence, weight, and/or center of gravity of a seat occupant.

It is a further object of the present invention to provide a seat frame assembly having a flat washer style load cell positioned between upper and lower seat members at each corner of the seat at a level underneath the seat belt restraint attachment of the seat for sensing the presence, weight, and/or center of gravity of a seat occupant.

It is still another object of the present invention to provide a seat frame assembly having a flat washer style load cell and a primary load carrying member such as a fastener passing through the load cell to join upper and lower seat members together with the load cell interposed between the seat members at a level underneath the seat belt restraint attachment of the seat for sensing the presence, weight, and/or center of gravity of a seat occupant.

It is still a further object of the present invention to provide a seat frame assembly having a flat washer style load cell and a primary load carrying member such as a fastener passing through the load cell to join upper and lower seat members together with the load cell interposed between the seat members and positioned in the FMVSS 207/210 load path for sensing the presence, weight, and/or center of gravity of a seat occupant.

It is still yet another object of the present invention to provide a seat frame assembly having a flat washer style load cell positioned between upper and lower seat members at a level underneath the seat belt restraint attachment of the seat for sensing the presence, weight, and/or center of gravity of a seat occupant in which each load cell is packaged in the FMVSS 207/210 load path without having to resist the FMVSS 207/210 load.

It is still yet a further object of the present invention to provide a seat frame assembly having a flat washer style load cell and a fastener passing through the load cell to join upper and lower seat structural members together with the load cell interposed between the seat members at a level underneath the seat belt restraint attachment of the seat for sensing the presence, weight, and/or center of gravity of a seat occupant in which the joining operation of the fastener is terminated at a predetermined joining force.

Yet, it is still another object of the present invention to provide a seat frame assembly having a flat washer style load cell and a spring positioned between upper and lower seat members at a level underneath the seat belt restraint attachment of the seat such that the spring imparts a predetermined pre-load on the load cell for improving the load cell's ability to sense the presence, weight, and/or center of gravity of a seat occupant.

Yet, it is still a further object of the present invention to provide a seat frame assembly having a flat washer style load cell, a spring, and a primary load carrying member such as a shoulder bolt passing through the load cell and the spring to join upper and lower seat members together with the load cell and the spring interposed between the seat members and positioned in the FMVSS 207/210 load path such that the spring imparts a predetermined pre-load on the load cell for improving the load cell's ability to sense the presence, weight, and/or center of gravity of a seat occupant.

In carrying out the above objects and other objects, the present invention provides a seat frame assembly for a vehicle. The seat frame assembly includes a seat portion and a seat back connected to the seat portion. An upper track is positioned beneath the seat portion and connected to the seat portion. A lower track is positioned beneath the upper track. The upper track and the lower track engage with one another such that the upper track is movable with respect to the lower track in order to move the seat portion and the seat back in a longitudinal direction with respect to the lower track.

A seat belt restraint attachment is positioned underneath the seat back between the seat portion and the upper track and connected to the upper track. A riser is positioned on a vehicle floor beneath the lower track. A flat washer style load cell is interposed between the lower track and the riser at a level below the seat belt restraint attachment. A fastener such as a shoulder bolt extends through the load cell and mounts the lower track to the riser. The load cell generates a sensor signal indicative of the weight of an occupant of the seat portion. The sensor signal may be processed to determine at least one of the presence, weight, and/or center of gravity of the occupant of the seat portion.

The seat frame assembly may further include a spring such as a wave washer, a piece of rubber, or the like interposed between the load cell and at least one of the lower track and the riser. The fastener extends through the spring and the load cell and mounts the lower track to the riser. The spring imparts a predetermined load on the load cell when the fastener mounts the lower track to the riser. The load cell takes into account the predetermined load when monitoring the weight of an occupant of the seat portion in order to enhance the resolution of the load cell.

The advantages of the present invention are numerous. For instance, the flat washer style load cell and associated fastener are packaged in the FMVSS 207/210 load path at a level beneath the seat belt restraint attachment thereby eliminating the need for a seat belt tension sensor. The fastener bears the brunt of the load on the seat thereby freeing the flat washer style load cell from having to manage the load. Further, in a second embodiment, a spring imparts a predetermined load on the flat washer style load cell when the fastener is tightened down. As a result, a relatively lighter duty load cell may be used which translates into a more cost effective and higher resolution system.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 5 illustrates a blown-up side view of the vehicle seat frame assembly shown in FIG. 4;

DETAILED DESCRIPTION OF THE PREFERRED EMBODIMENT(S)

Figure 1:
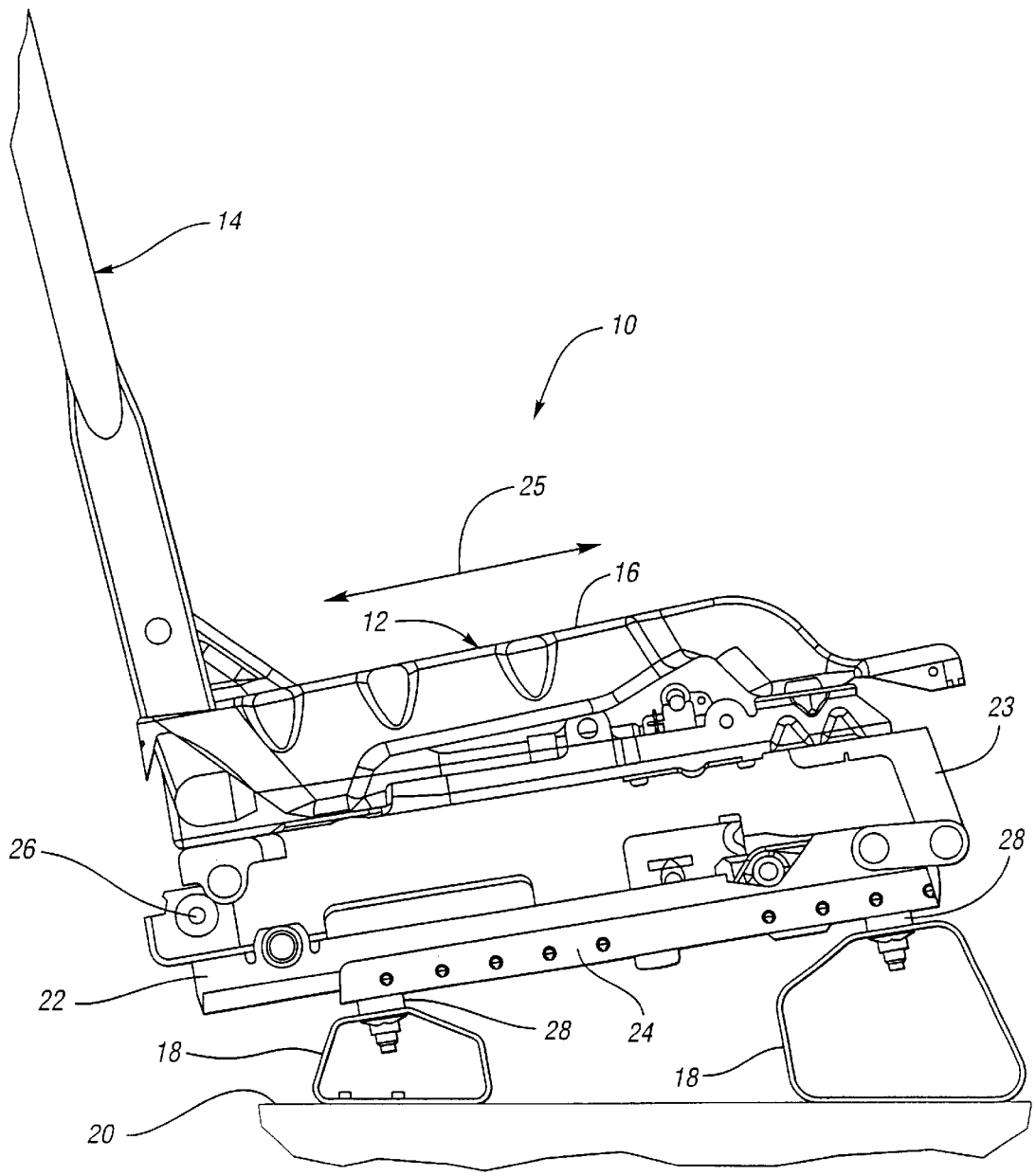
FIG. 1 illustrates a side view of a vehicle seat frame assembly in accordance with a first embodiment of the present invention.
Figure 2:
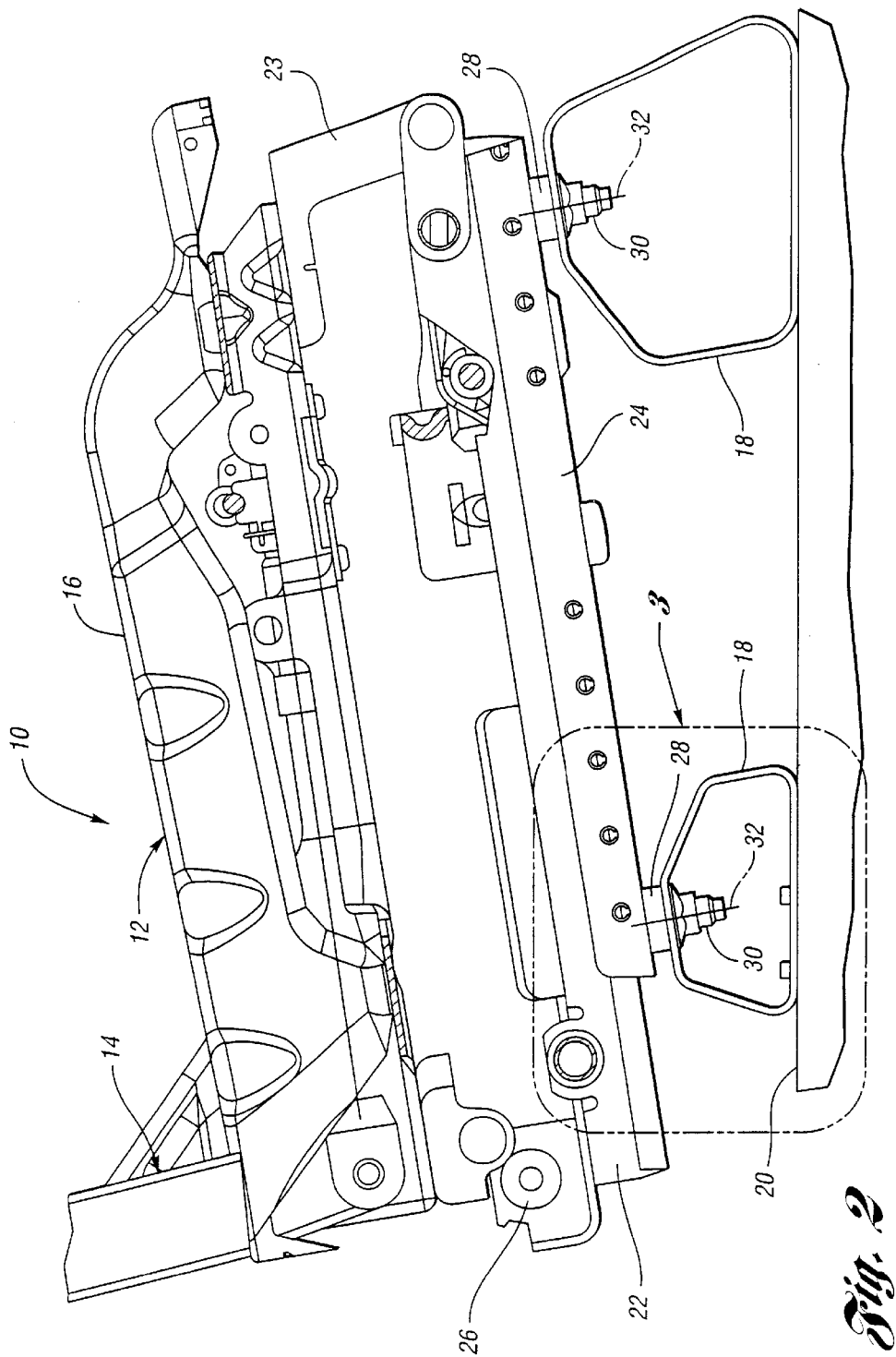
FIG. 2 illustrates a blown-up side view of the vehicle seat frame assembly shown in FIG. 1.
Figure 3:
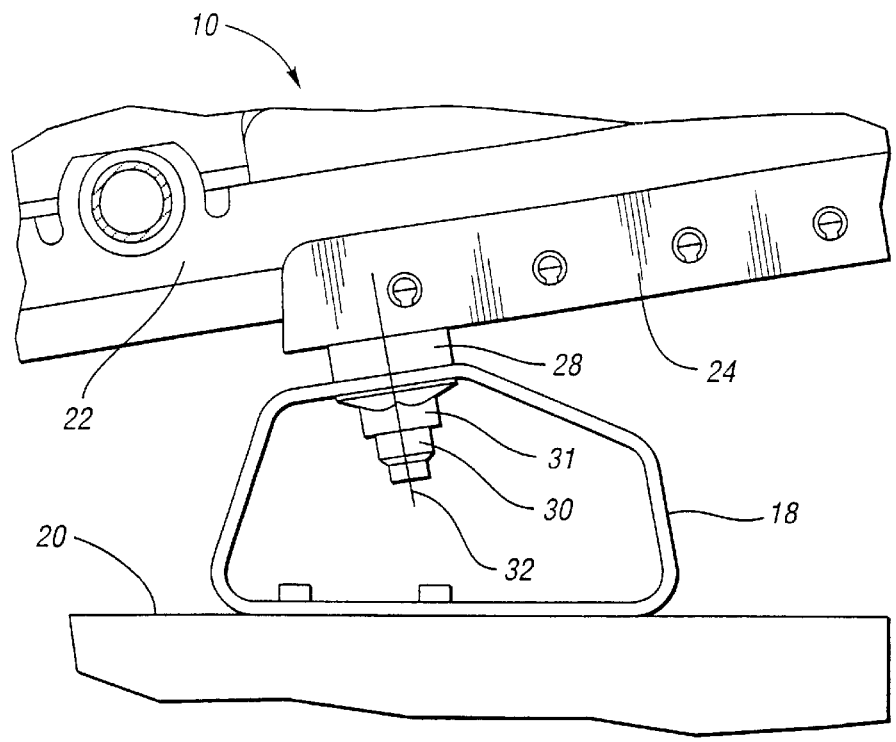
FIG. 3 illustrates a blown-up view of the dotted area 3 shown in FIG. 2.

Referring now to FIGS. 1, 2 and 3, a vehicle seat frame assembly 10 in accordance with a first embodiment of the present invention is shown. Seat frame assembly 10 generally includes a seat portion 12 and a seat back 14. Seat portion 12 and seat back 14 are connected together. Seat portion 12 includes a rigid seat cushion pan 16 for supporting the weight of an occupant of seat portion 12. Seat back 14 supports the occupant's back while the occupant is sitting on seat portion 12. Seat frame assembly 10 further includes risers 18 located underneath each corner of seat portion 12 and spaced apart from the seat portion. Preferably, seat frame assembly 10 includes four risers 18 with each riser being associated with a respective one of four corners of seat portion 12. Risers 18 are secured to a vehicle floor 20 and generally support seat frame assembly 10 and an occupant of the seat frame assembly above the vehicle floor.

Seat frame assembly 10 further includes an upper track or slide 22 and a lower track 24 on each side of seat portion 12. Upper track 22 and lower tracks 24 are located beneath seat portion 12 and are spaced apart from the seat portion. A power adjuster is located between seat portion 12 and vehicle floor 20. A power adjuster link 23 located underneath the front and back sides of seat portion 12 connects the seat portion to upper track 22. Upper track 22 and lower tracks 24 are operable with one another for causing movement of seat portion 12 and seat back 14 in a direction 25 relative to vehicle floor 20. Lower tracks 24 are mounted to risers 18 and remain secured in position. Upper track 22 slides within lower tracks 24 to move along direction 25 relative to the lower tracks. This enables an occupant of seat frame assembly 10 to move seat portion 12 and seat back 14 back and forth for proper positioning relative to the interior of the vehicle.

Seat frame assembly 10 also includes a seat belt restraint attachment 26 located underneath seat back 14 and between seat portion 12 and upper track 22. Seat belt restraint attachment 26 is secured to upper track 22 and moves along direction 25 when the upper track slides along lower tracks 24. Seat belt restraint attachment 26 is used to anchor a seat belt fastened around an occupant of seat frame assembly 10.

In accordance with the present invention, seat frame assembly 10 further includes a load cell 28 interposed between each lower track 24 and riser 18. Each load cell 28 has the form of a flat washer with a through hole. A primary load carrying member 30 such as a riveted or threaded fastener extends through the through hole of a respective load cell 28. Each fastener 30 extends through fastener apertures of respective lower tracks 24 and risers 18 to mount the lower tracks to the risers with load cells 28 being sandwiched and interposed between the lower tracks and the risers underneath each corner of seat portion 12. Each fastener 30 is tightened against a hex or weld nut 31 positioned underneath a respective riser 18 to provide a predetermined force joining lower tracks 24 to the risers underneath each corner of seat portion 12. Load cells 28 are operable for measuring the joining force while fasteners 30 are being tightened and may be used to determine when the predetermined joining force has been reached.

Load cells 28 directly measure the weight of an imposed load on seat portion 12. When an occupant sits on seat portion 12, the weight of the occupant is transferred through seat pan 16 to risers 18 and floor 20 via load cells 28. Load cells 28 generate load cell electrical sensor signals indicative of the measured occupant weight. Load cells 28 used with seat assembly 10 may include the Miniature Low Profile Washer ELW Load Cells from Entran Devices, Inc. of Fairfield, N.J. The height of such load cells typically falls into a range of 0.15 inches to 0.30 inches.

As shown in FIGS. 1, 2, and 3, load cells 28 and associated fasteners 30 are positioned at a level underneath seat belt restraint attachment 26 beneath each corner of seat portion 12 in the FMVSS 207/210 load path extending along line 32. This results in an efficient placement of load cells 28 because a seat belt tension sensor is not needed to measure the force generated when seat belt restraint attachment 26 secures a fastened seat belt. In contrast, if load cells 28 and associated fasteners 30 were located at a level above seat belt restraint attachment 26 then a seat belt tension sensor would be needed to measure the force generated when seat belt restraint attachment 26 secures a fastened seat belt. Further, fasteners 30 act as the primary load carrying member thereby allowing load cells 28 to not have to resist the FMVSS 207/210 load.

Figure 6:
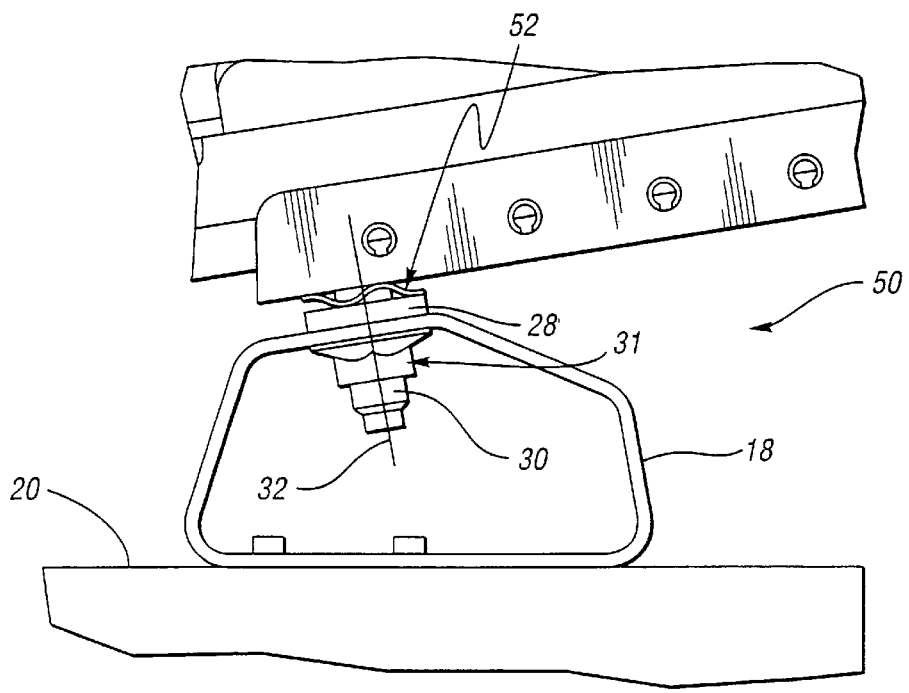
FIG. 6 illustrates a blown-up view of the dotted area 6 shown in FIG. 5.
Figure 4:
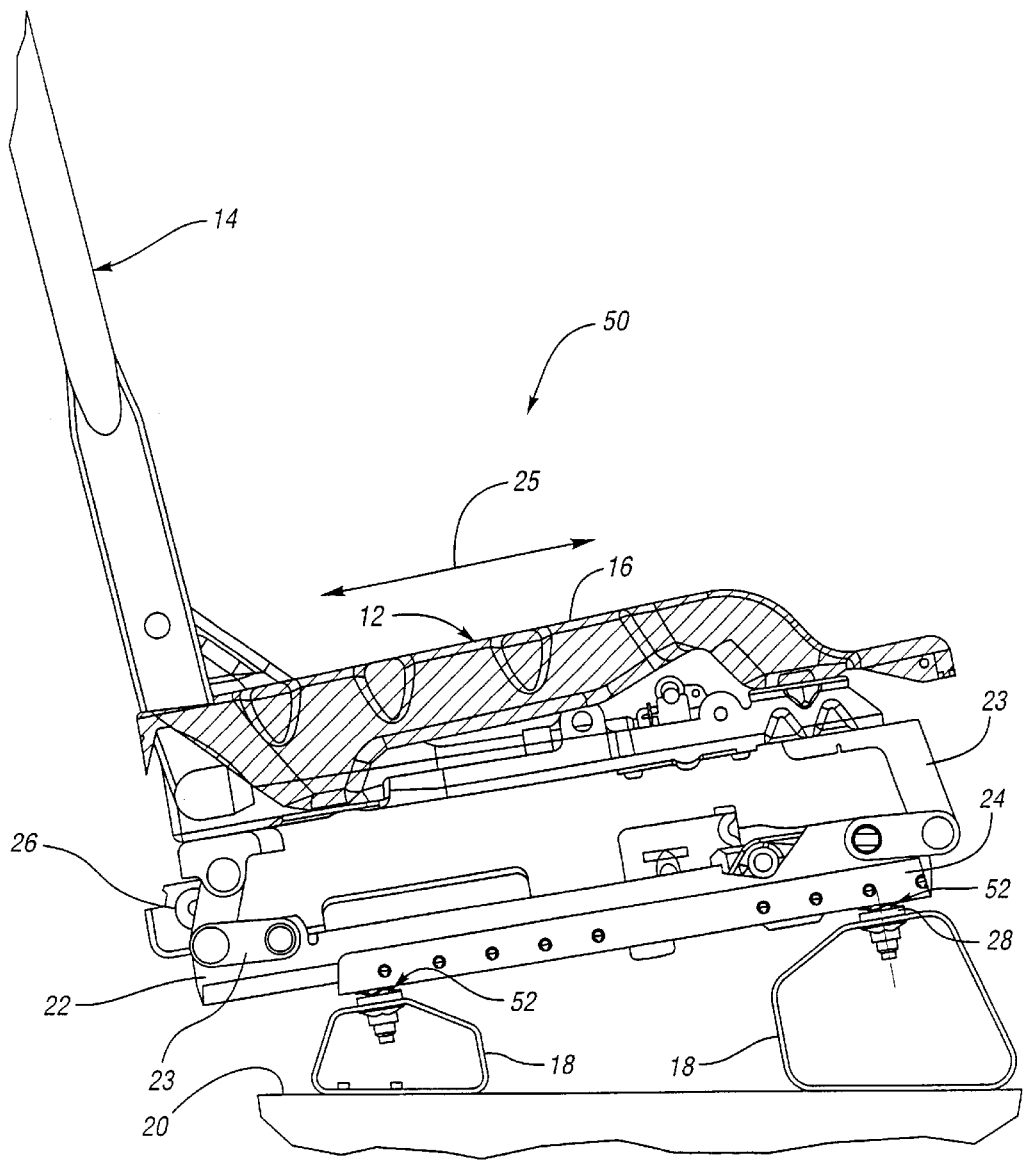
FIG. 4 illustrates a side view of a vehicle seat frame assembly in accordance with a second embodiment of the present invention.

Referring now to FIGS. 4, 5, and 6, a vehicle seat frame assembly 50 in accordance with a second embodiment of the present invention is shown. Seat frame assembly 50 generally includes the same elements of seat frame assembly 10 and like elements are designated with like reference numerals. Seat frame assembly 50 generally differs from seat frame assembly 10 by further including a spring 52 such as a wave washer as shown in FIGS. 4, 5, and 6, a piece of rubber, or the like associated with each load cell 28. As shown in FIGS. 4, 5, and 6, wave washer 52 is sandwiched and interposed between load cell 28 and a lower track 24 underneath each corner of seat portion 12. Alternatively, wave washer 52 may be sandwiched and interposed between load cell 28 and riser 18 underneath each corner of seat portion 12.

Advantageously, wave washer 52 compresses and imparts a predetermined load on load cell 28 when fastener 30 such as a shoulder bolt is tightened against nut 31. As a result of the predetermined load being imparted on load cell 28, a lighter duty load cell may be used as compared to the load cell arrangement described with respect to seat frame assembly 10. This translates into a more cost effective and higher resolution seat occupant sensing system.

Figure 7:
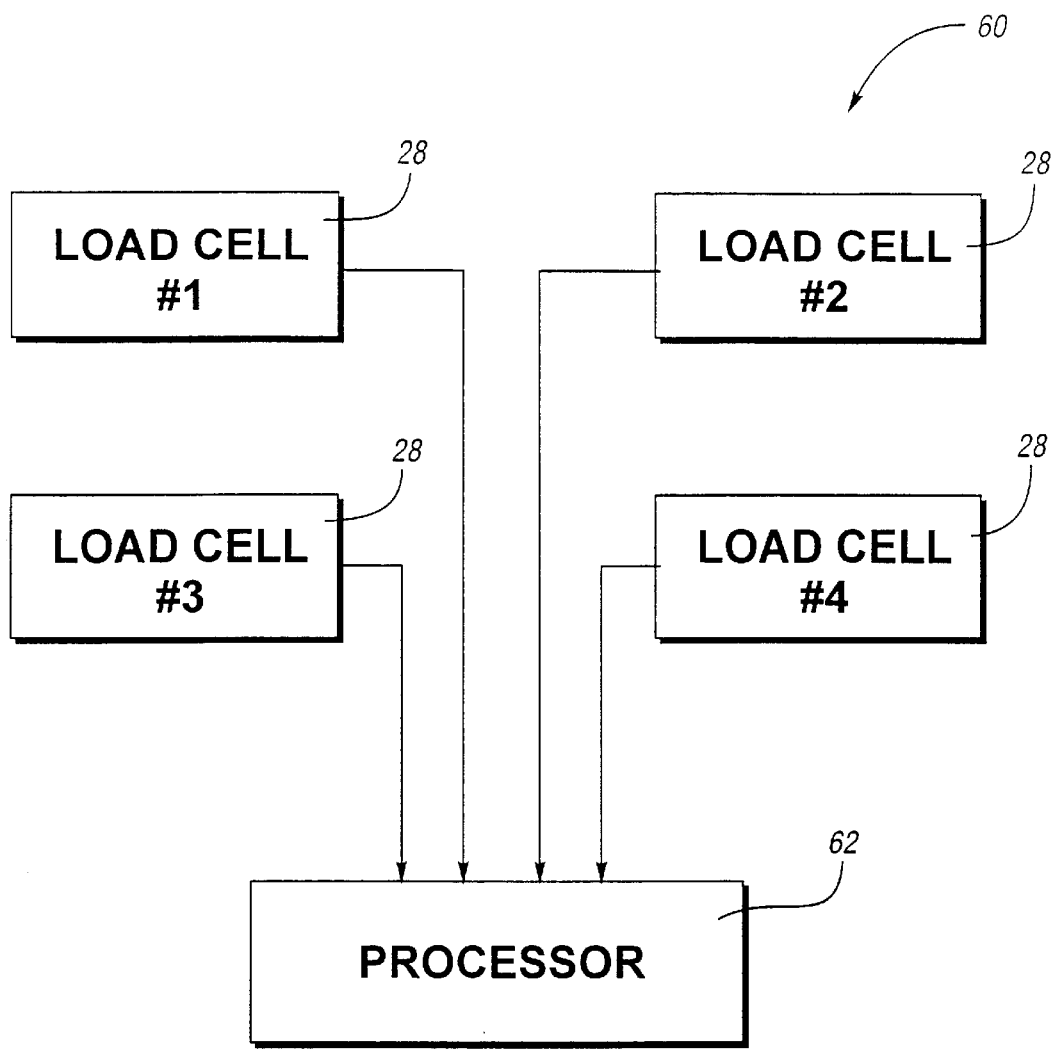
FIG. 7 illustrates a block diagram of a seat occupant system of the vehicle seat frame assembly in accordance with the present invention for sensing the presence, weight, and/or center of gravity of a seat occupant.

Referring now to FIG. 7, a block diagram of a seat occupant system 60 for sensing the weight of an occupant of seat frame assemblies 10 and 50 is shown. Each load cell 28 provides a sensor signal indicative of the weight of an occupant on seat portion 12 to a processor 62. Processor 62 processes each of the sensor signals to determine the weight seat portion 12 is bearing. Algorithms for translating load cell sensor signals to a weight are known and are used for example in electronic bathroom scales. The algorithms take into account the weight of all the elements of seat assemblies 10 and 50 (minus the weight of risers 18) and the joining force exerted by fasteners 30 joining lower tracks 24 to the risers in determining the weight of an occupant of the seating assemblies. If processor 62 determines that the weight of the seat occupant is zero then the seat is unoccupied and the processor may provide an indication of same. Processor 62 may determine the weight of an occupant of seat frame assemblies 10 and 50 in order to control activation of a safety device such as an air bag as a function of the occupant's weight.

Thus, processor 62 may determine the presence or absence of an object or person on seat portion 12 and the weight of the object or person on the seat portion. Based upon these determinations, processor 62 may activate one or more safety devices and control the manner in which an activated safety device operates. Processor 62 can further process the sensor signals to determine the center of gravity of the occupant with respect to seat portion 12 using known algorithms.

Thus it is apparent that there has been provided, in accordance with the present invention, a vehicle seat frame assembly having at least one flat washer style load cell packaged in the FMVSS 207/210 load path for sensing the presence, weight, and/or center of gravity of a seat occupant that fully satisfies the objects, aims, and advantages set forth above. While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat frame assembly, the assembly comprising:
   a seat portion having four corners;
   a seat back connected to the seat portion, the seat back positioned within and above the seat portion;
   an upper track positioned beneath the seat portion;
   a seat adjustor link interposed between the seat portion and the upper track, the seat adjustor link connecting the upper track and the seat portion;
   a pair of lower tracks positioned beneath the upper track underneath opposite sides of the seat portion, wherein the upper track and the lower tracks engage with one another such that the upper track is movable with respect to the lower tracks in order to move the seat portion and the seat back in a longitudinal direction with respect to the lower tracks in response to operation of the seat adjustor link;
   a seat belt restraint attachment positioned underneath the seat back between the seat portion and the upper track, the seat belt restraint attachment connected to the upper track;
   a riser positioned on a vehicle floor beneath the lower tracks underneath each corner of the seat portion;
   a wave washer positioned above the risers underneath each corner of the seat portion;
   a flat washer style load cell interposed between the lower track and the wave washer underneath each corner of the seat portion at a level below the seat belt restraint attachment, wherein each load cell generates a sensor signal indicatve of the weight of an occupant of the seat portion; and
   a shoulder bolt extending through each load cell and the wave washer and mounting the lower tracks to the risers with the load cell and the wave washer being interposed therebetween and contacting one another, wherein the wave washer compresses and directly imparts on the load cell a load in proportion to mounting force applied by the shoulder bolt as the shoulder bolt mounts the lower tracks to the risers, wherein the load cell generates a sensor signal indicative of the weight of an occupant of the seat portion while taking into account the mounting force.

2. The assembly of claim 1 further comprising:
   a processor for processing the sensor signal to determine at least one of the presence, weight, and center of gravity of the occupant of the seat portion.

3. The assembly of claim 2 wherein:
   the processor controls a safety device associated with the seat portion as a function of at least one of the presence, weight, and center of gravity of the occupant of the seat portion.

4. A vehicle seat frame assembly, the assembly comprising:

a seat portion;

a seat back connected to the seat portion, the seat back being positioned within and above the seat portion;

an upper track positioned beneath the seat portion;

a seat adjustor link interposed between the seat portion and the upper track, the seat adjustor link connecting the seat portion and the upper track;

a lower track positioned beneath the upper track, wherein the upper track and the lower track engage with one another such that the upper track is movable with respect to the lower track in order to move the seat portion and the seat back in a longitudinal direction with respect to the lower track in response to operation of the seat adjustor link;

a seat belt restraint attachment positioned underneath the seat back between the seat portion and the upper track, the seat belt restraint attachment connected to the upper track;

a riser positioned on a vehicle floor beneath the lower track;

a wave washer positioned underneath the lower track;

a flat washer style load cell interposed between the wave washer and the riser at a level below the seat belt restraint attachment, a shoulder bolt extending through the wave washer and the load cell and mounting the lower track to the riser with the wave washer and the load cell being interposed therebetween and contacting one another, wherein the wave washer compresses and directly imparts on the load cell a load in proportion to mounting force applied by the shoulder bolt as the shoulder bolt mounts the lower track to the riser, wherein the load cell generates a sensor signal indicative of the weight of an occupant of the seat portion while taking into account the mounting force.

* * * * *